(12) United States Patent
Mahamuni et al.

(10) Patent No.: US 12,278,744 B2
(45) Date of Patent: Apr. 15, 2025

(54) MULTI-NODE FAILURE PROCESSING FOR COMPUTER NETWORKS

(71) Applicant: Kyndryl, Inc., New York, NY (US)

(72) Inventors: Amol Bhaskar Mahamuni, Bangalore (IN); Kiran Kumar K, Bangalore (IN)

(73) Assignee: Kyndryl, Inc., Armonk, NY (US)

( * ) Notice: Subject to any disclaimer, the term of this patent is extended or adjusted under 35 U.S.C. 154(b) by 69 days.

(21) Appl. No.: 18/343,785

(22) Filed: Jun. 29, 2023

(65) Prior Publication Data

US 2025/0007797 A1    Jan. 2, 2025

(51) Int. Cl.
| | |
|---|---|
| H04L 43/026 | (2022.01) |
| H04L 41/0631 | (2022.01) |
| H04L 41/14 | (2022.01) |
| H04L 41/147 | (2022.01) |
| H04L 41/149 | (2022.01) |

(52) U.S. Cl.
CPC .......... *H04L 43/026* (2013.01); *H04L 41/065* (2013.01); *H04L 41/145* (2013.01); *H04L 41/147* (2013.01); *H04L 41/149* (2022.05)

(58) Field of Classification Search
CPC ... H04L 43/026; H04L 41/06; H04L 41/0631; H04L 41/065; H04L 41/12; H04L 41/14; H04L 41/145; H04L 41/147; H04L 41/149
See application file for complete search history.

(56) References Cited

U.S. PATENT DOCUMENTS

| | | | |
|---|---|---|---|
| 7,409,676 B2 | 8/2008 | Agarwal et al. | |
| 9,742,638 B1 | 8/2017 | McCabe et al. | |
| 2005/0144188 A1 | 6/2005 | Bailey et al. | |
| 2012/0096143 A1 | 4/2012 | Suit | |
| 2012/0278261 A1 * | 11/2012 | Lin | G06N 5/01 |
| | | | 707/690 |
| 2017/0344558 A1 * | 11/2017 | Chen | G06F 16/9024 |
| 2019/0213504 A1 | 7/2019 | Vasseur et al. | |
| 2020/0137104 A1 * | 4/2020 | Hassanzadeh | H04L 63/1433 |
| 2020/0387846 A1 | 12/2020 | Jones et al. | |
| 2021/0184916 A1 | 6/2021 | Ramanujan et al. | |
| 2021/0208983 A1 | 7/2021 | Lin et al. | |
| 2022/0188424 A1 | 6/2022 | Chan et al. | |

FOREIGN PATENT DOCUMENTS

| | | | |
|---|---|---|---|
| CN | 113836156 A | * | 12/2021 |
| CN | 115622903 A | * | 1/2023 |

OTHER PUBLICATIONS

Amani et al. ("Discovering Important Nodes of Complex Networks Based on Laplacian Spectra", IEEE) (Year: 2023).*

(Continued)

*Primary Examiner* — Boris D Grijalva Lobos
(74) *Attorney, Agent, or Firm* — CANTOR COLBURN LLP; Erik Swanson

(57) ABSTRACT

Some embodiments of the present disclosure are directed to systems, computer-readable media, and computer-implemented methods for multi-node failure processing in computer networks. In particular, some embodiments are directed to generating and displaying an impact area graph for a respective node from a plurality of nodes in a network, wherein the impact area graph depicts the relative predicted impact to each other node in the network from a failure of the respective node. Other embodiments may be disclosed or claimed.

20 Claims, 16 Drawing Sheets

(56) References Cited

OTHER PUBLICATIONS

Richards et al. ("Eigen Analysis of Networks", Journal of Social Structure) (Year: 2000).*

Afzaal et al., "Hybrid subnet-based node failure recovery formal procedure in wireless sensor and actor networks," International Journal of Distributed Sensor Networks, vol. 13, No. 4, Apr. 2017, 17 pages.

Agarwal et al., "Mining Activity Data for Dynamic Dependency Discovery in e-Business Systems," IEEE, Dec. 2004, 13 pages.

Fu et al., "Exploring the impact of node mobility on cascading failures in spatial networks," Information Sciences, vol. 576, Oct. 2021, pp. 140-156 (Abstract Only).

Hongyan et al., "Failure analysis of network nodes and edges in scale-free networks," Communication in Statistics—Theory and Methods, vol. 49, 2020, 2 pages (Abstract Only).

Hossain et al, "On the Impact of Node Failure on Network Coverage in Wireless Sensor Network," 5th International Conference on Computer and Devices for Communication, 2012, 4 pages.

Huang et al., "The Coverage Problem in a Wireless Sensor Network," WSNA '03: Proceedings of the 2nd ACM International Conference on Wireless Sensor Networks and Applications, Sep. 2003, 7 pages.

Kandula et al., "Sherlock—Diagnosing Problems in the Enterprise," Conference Talk at SIGCOMM, Aug. 2007, 41 pages.

Li et al., "An Effective Node-To-Edge Interdependent Network and Vulnerability Analysis for Digital Coupled Power Grids," Hindawi International Transactions on Electrical Energy Systems, vol. 2022, Article ID 5820126, Sep. 2022, pp. 1-13.

Lou et al., "Mining Dependency in Distributed Systems Through Unstructured Logs Analysis," ACM SIGOPS Operating Systems Review, vol. 44, No. 1, Mar. 2010, 6 pages.

Martins et al., "Impact of node failure in Optical Packet Switching Metropolitan-area Networks," IEEE Conference Publication, 2011, 4 pages (Abstract Only).

Xie et al., "Analysis Model of Node Failures and Impact for AANET," Frontiers in Cyber Security, Nov. 2020, pp. 55-64 (Abstract Only).

Ye et al., "Partial Node Failure in Shortest Path Network Problems," Sustainability, 2019, 11, 6275, pp. 1-21.

* cited by examiner

| | boutique-loadgen | boutique-payment | boutique-cartserv | boutique-svc | boutique-recom | boutique-add | boutique-redcart | boutique-prodserv | boutique-ship | boutique-email | boutique-front | boutique-crncy | boutique-checkout |
|---|---|---|---|---|---|---|---|---|---|---|---|---|---|
| boutique-loadgen | 0 | 0 | 0 | 0 | 0 | 0 | 0 | 0 | 0 | 0 | 373 | 0 | 0 |
| boutique-payment | 0 | 0 | 0 | 0 | 0 | 0 | 0 | 0 | 0 | 0 | 0 | 0 | 52 |
| boutique-cartserv | 0 | 0 | 0 | 0 | 0 | 0 | 60 | 0 | 0 | 0 | 0 | 0 | 0 |
| boutique-svc | 0 | 0 | 0 | 0 | 0 | 1 | 0 | 0 | 0 | 0 | 0 | 0 | 1 |
| boutique-recom | 0 | 0 | 0 | 0 | 0 | 0 | 0 | 31 | 0 | 0 | 0 | 0 | 0 |
| boutique-add | 0 | 0 | 0 | 0 | 0 | 0 | 0 | 0 | 0 | 0 | 0 | 0 | 0 |
| boutique-redcart | 0 | 0 | 60 | 0 | 0 | 0 | 0 | 0 | 0 | 0 | 0 | 0 | 0 |
| boutique-prodserv | 0 | 0 | 0 | 0 | 0 | 0 | 0 | 0 | 0 | 0 | 30 | 0 | 64 |
| boutique-ship | 0 | 0 | 0 | 0 | 0 | 0 | 0 | 31 | 0 | 0 | 31 | 0 | 108 |
| boutique-email | 0 | 0 | 0 | 0 | 0 | 0 | 0 | 0 | 0 | 0 | 28 | 0 | 0 |
| boutique-front | 0 | 0 | 31 | 0 | 30 | 30 | 0 | 0 | 28 | 0 | 0 | 31 | 30 |
| boutique-crncy | 0 | 0 | 0 | 0 | 0 | 0 | 0 | 0 | 0 | 53 | 0 | 0 | 0 |
| boutique-checkout | 0 | 52 | 110 | 1 | 0 | 0 | 0 | 64 | 108 | 0 | 0 | 200 | 0 |

FIG. 2B

| Node/Service | Degree_Out |
|---|---|
| boutique-loadgen | 373 |
| boutique-payment | 52 |
| boutique-cartserv | 60 |
| boutique-svc | 2 |
| boutique-recom | 31 |
| boutique-add | 0 |
| boutique-redcart | 90 |
| boutique-prodserv | 95 |
| boutique-ship | 136 |
| boutique-email | 0 |
| boutique-front | 584 |
| boutique-crncy | 0 |
| boutique-checkout | 588 |

FIG. 2C

| Node/Service | Degree_In |
|---|---|
| boutique-loadgen | 373 |
| boutique-payment | 52 |
| boutique-cartserv | 201 |
| boutique-svc | 1 |
| boutique-recom | 30 |
| boutique-add | 31 |
| boutique-redcart | 60 |
| boutique-prodserv | 126 |
| boutique-ship | 136 |
| boutique-email | 53 |
| boutique-front | 462 |
| boutique-crncy | 231 |
| boutique-checkout | 255 |

FIG. 2D

```
0:  'boutique-loadgen'
1:  'boutique-payment'
2:  'boutique-cartserv'
3:  'boutique-svc'
4:  'boutique-recom'
5:  'boutique-add'
6:  'boutique-redcart'
7:  'boutique-prodserv'
8:  'boutique-ship'
9:  'boutique-email'
10: 'boutique-front'
11: 'boutique-crncy'
12: 'boutique-checkout'
```

FIG. 2E

```
('boutique-checkout', 'boutique-loadgen'): [12, 10, 0]
('boutique-checkout', 'boutique-payment'): [12, 1]
('boutique-checkout', 'boutique-cartserv'): [12, 10, 6, 2]
('boutique-checkout', 'boutique-svc'): [12, 3]
('boutique-checkout', 'boutique-recom'): [12, 7, 4]
('boutique-checkout', 'boutique-add'): []
('boutique-checkout', 'boutique-redcart'): [12, 10, 6]
('boutique-checkout', 'boutique-prodserv'): [12, 7]
('boutique-checkout', 'boutique-ship'): [12, 8]
('boutique-checkout', 'boutique-email'): []
('boutique-checkout', 'boutique-front'): [12, 10]
('boutique-checkout', 'boutique-crncy'): []
('boutique-checkout', 'boutique-checkout'): [12]
```

FIG. 2F ('boutique-checkout', 'boutique-loadgen'): [12, 8, 10, 0]
('boutique-checkout', 'boutique-payment'): [12, 1]
('boutique-checkout', 'boutique-cartserv'): [12, 2]
('boutique-checkout', 'boutique-svc'): [12, 3]
('boutique-checkout', 'boutique-recom'): [12, 8, 10, 4]
('boutique-checkout', 'boutique-add'): [12, 8, 10, 5]
('boutique-checkout', 'boutique-redcart'): [12, 2, 6]
('boutique-checkout', 'boutique-prodserv'): [12, 7]
('boutique-checkout', 'boutique-ship'): [12, 8]
('boutique-checkout', 'boutique-email'): [12, 9]
('boutique-checkout', 'boutique-front'): [12, 8, 10]
('boutique-checkout', 'boutique-crncy'): [12, 11]
('boutique-checkout', 'boutique-checkout'): [12]

FIG. 2G

| Node/Service | Closeness_Out |
|---|---|
| boutique-loadgen | 8.266264731 |
| boutique-payment | 7.674539603 |
| boutique-cartserv | 6.290373912 |
| boutique-svc | 0.977694999 |
| boutique-recom | 6.928039648 |
| boutique-add | 0 |
| boutique-redcart | 6.959170634 |
| boutique-prodserv | 8.507100745 |
| boutique-ship | 8.696590981 |
| boutique-email | 0 |
| boutique-front | 8.437674143 |
| boutique-crncy | 0 |
| boutique-checkout | 8.875258795 |

FIG. 2H

| Node/Service | Closeness_In |
|---|---|
| boutique-loadgen | 6.455769109 |
| boutique-payment | 6.142540189 |
| boutique-cartserv | 7.31465096 |
| boutique-svc | 0.966562758 |
| boutique-recom | 5.596534442 |
| boutique-add | 6.143711348 |
| boutique-redcart | 6.599495333 |
| boutique-prodserv | 6.724976449 |
| boutique-ship | 6.627849213 |
| boutique-email | 6.66655569 |
| boutique-front | 6.556640499 |
| boutique-crncy | 7.479181793 |
| boutique-checkout | 6.863178664 |

FIG. 2I

| Node/Service | Betweenness |
|---|---|
| boutique-loadgen | 0 |
| boutique-payment | 0 |
| boutique-cartserv | 8 |
| boutique-svc | 0 |
| boutique-recom | 0 |
| boutique-add | 0 |
| boutique-redcart | 11 |
| boutique-prodserv | 11 |
| boutique-ship | 11 |
| boutique-email | 0 |
| boutique-front | 47 |
| boutique-crncy | 0 |
| boutique-checkout | 54 |

FIG. 2J

| Node/Service | Eigencentrality |
|---|---:|
| boutique-loadgen | 0.990387351 |
| boutique-payment | 0.018425308 |
| boutique-cartserv | 0.124446093 |
| boutique-svc | 0.000354333 |
| boutique-recom | 0.079655819 |
| boutique-add | 0.07965676 |
| boutique-redcart | 0.019825711 |
| boutique-prodserv | 0.111544867 |
| boutique-ship | 0.112613379 |
| boutique-email | 0.018779641 |
| boutique-front | 1 |
| boutique-crncy | 0.153177584 |
| boutique-checkout | 0.133448952 |

FIG. 2K

| Node/Service | Degree_In | Degree_Out | Betweenness | Eigencentrality | Closeness_In | Closeness_Out | ImportScore |
|---|---|---|---|---|---|---|---|
| boutique-loadgen | 373 | 373 | 0 | 0.920287351 | 6.465769100 | 8.206366731 | 266194.7716 |
| boutique-payment | 52 | 52 | 0 | 0.018625328 | 6.142540189 | 7.674538603 | 12802.81209 |
| boutique-cartsvc | 201 | 60 | 98 | 0.124446793 | 7.311465076 | 6.290372912 | 10967.5411 |
| boutique-svc | 1 | 2 | 0 | 0.000035433 | 0.966462758 | 0.977064599 | 1010.392713 |
| boutique-recom | 30 | 31 | 0 | 0.077665818 | 5.596194442 | 6.918039648 | 17200.1491 |
| boutique-add | 31 | 0 | 0 | 0.079965676 | 6.145711348 | 0 | 10757.07966 |
| boutique-redsvt | 60 | 90 | 11 | 0.019625711 | 6.599865333 | 6.995170634 | 56766.85116 |
| boutique-prodsvc | 126 | 95 | 11 | 0.111844067 | 6.724976440 | 8.507100245 | 12317.8615 |
| boutique-ship | 136 | 136 | 11 | 0.113611379 | 6.077840213 | 8.606569081 | 151702.4459 |
| boutique-email | 53 | 0 | 0 | 0.018778041 | 6.644455669 | 0 | 13603.32781 |
| boutique-front | 482 | 584 | 47 | 1 | 6.556646459 | 8.437678143 | 575120.8333 |
| boutique-ccy | 231 | 0 | 0 | 0.153172534 | 7.471181793 | 0 | 10732665282 |
| boutique-checkout | 235 | 588 | 94 | 0.113848052 | 6.863176624 | 8.875358799 | 268699.5518 |

FIG. 2L

| Node/Service | predicted_score | Influence Rank |
|---|---|---|
| boutique-front | 6757.289629 | 1 |
| boutique-loadgen | 6426.869569 | 2 |
| boutique-checkout | 1445.002695 | 3 |
| boutique-crncy | 1333.428923 | 4 |
| boutique-cartserv | 1115.630557 | 5 |
| boutique-ship | 930.6968495 | 6 |
| boutique-prodserv | 893.6807523 | 7 |
| boutique-add | 504.7534882 | 8 |
| boutique-recom | 494.5853594 | 9 |
| boutique-redcart | 241.8067967 | 10 |
| boutique-email | 206.3993997 | 11 |
| boutique-payment | 197.7464373 | 12 |
| boutique-svc | 1.756668298 | 13 |

|  | boutique-loadgen | boutique-payment | boutique-cartserv | boutique-svc | boutique-recom | boutique-add | boutique-redcart | boutique-prodserv | boutique-ship | boutique-email | boutique-front | boutique-crncy | boutique-checkout |
|---|---|---|---|---|---|---|---|---|---|---|---|---|---|
| boutique-loadgen | 0 | 0 | 0 | 0 | 0 | 0 | 0 | 0 | 0 | 0 | 187 | 0 | 0 |
| boutique-payment | 0 | 0 | 0 | 0 | 0 | 0 | 0 | 0 | 0 | 0 | 0 | 0 | 1 |
| boutique-cartserv | 0 | 0 | 0 | 0 | 0 | 0 | 0 | 0 | 0 | 0 | 0 | 0 | 0 |
| boutique-svc | 0 | 0 | 0 | 0 | 0 | 0 | 13 | 0 | 0 | 0 | 0 | 0 | 1 |
| boutique-recom | 0 | 0 | 0 | 0 | 0 | 0 | 0 | 16 | 0 | 0 | 0 | 0 | 0 |
| boutique-add | 0 | 0 | 0 | 0 | 0 | 0 | 0 | 0 | 0 | 0 | 0 | 0 | 0 |
| boutique-redcart | 0 | 0 | 23 | 0 | 0 | 0 | 0 | 0 | 0 | 0 | 0 | 0 | 0 |
| boutique-prodserv | 0 | 0 | 0 | 0 | 0 | 0 | 0 | 0 | 0 | 0 | 12 | 0 | 14 |
| boutique-ship | 0 | 0 | 0 | 0 | 0 | 0 | 0 | 0 | 0 | 0 | 7 | 0 | 23 |
| boutique-email | 0 | 0 | 0 | 0 | 0 | 0 | 0 | 0 | 0 | 0 | 6 | 0 | 0 |
| boutique-front | 138 | 0 | 12 | 0 | 12 | 12 | 0 | 12 | 1 | 0 | 0 | 12 | 12 |
| boutique-crncy | 0 | 0 | 0 | 0 | 0 | 0 | 0 | 0 | 0 | 0 | 0 | 0 | 0 |
| boutique-checkout | 0 | 6 | 12 | 1 | 0 | 0 | 0 | 7 | 12 | 6 | 0 | 22 | 0 |

FIG. 20

| Node/Service | Degree_In | Degree_Out | Betweenness | Eigencentral | Closeness_In | Closeness_Out |
|---|---|---|---|---|---|---|
| boutique-loadgen | 138 | 187 | 0 | 0.85603048 | 3.402175203 | 5.002272458 |
| boutique-payment | 6 | 11 | 0 | 0.00345591 | 2.701805286 | 3.060379341 |
| boutique-cartserv | 47 | 13 | 19 | 0.08229609 | 4.37905698 | 3.047310209 |
| boutique-svc | 1 | 2 | 0 | 0.00057599 | 0.9070738 | 0.877840002 |
| boutique-recom | 12 | 16 | 0 | 0.07443743 | 2.875271243 | 3.383817383 |
| boutique-add | 13 | 0 | 0 | 0.07444101 | 3.234250069 | 0 |
| boutique-redcart | 13 | 35 | 22 | 0.0066364 | 3.328320578 | 3.923747981 |
| boutique-prodserv | 35 | 21 | 11 | 0.08585724 | 3.828831503 | 3.970248096 |
| boutique-ship | 23 | 29 | 0 | 0.07514614 | 3.870124469 | 4.062782775 |
| boutique-email | 6 | 0 | 0 | 0.00345591 | 2.786538475 | 0 |
| boutique-front | 212 | 221 | 47 | 1 | 3.480956022 | 5.124383277 |
| boutique-crncy | 34 | 0 | 0 | 0.08710912 | 4.556343299 | 0 |
| boutique-checkout | 61 | 66 | 54 | 0.09285421 | 4.682585322 | 4.004217621 |

FIG. 2P

| Node/Service | predicted_score |
|---|---|
| boutique-loadgen | 5145.535403 |
| boutique-payment | 24.02103109 |
| boutique-cartserv | 566.9354291 |
| boutique-svc | 3.347959962 |
| boutique-recom | 436.9784752 |
| boutique-add | 442.6569527 |
| boutique-redcart | 77.13404614 |
| boutique-prodserv | 556.3329447 |
| boutique-ship | 463.9019136 |
| boutique-email | 28.5373652 |
| boutique-front | 6157.291388 |
| boutique-crncy | 555.6300265 |
| boutique-checkout | 694.3415337 |

FIG. 2Q

MULTI-NODE FAILURE PROCESSING FOR COMPUTER NETWORKS

BACKGROUND

Embodiments of the present disclosure generally relate to computer networks, and more specifically, to computer systems, computer-implemented methods, and computer program products for multi-node failure processing in computer networks.

Increasingly, computer networks are utilized in a wide variety of applications, including on-premise information technology (IT) infrastructure as well as hybrid multi-cloud systems that allow users to quickly scale up or scale down the capabilities of their network. One important aspect of operating such networks is detecting and mitigating failures that may occur due to a wide range of issues, including hardware failures, software bugs, and power outages, among others.

To help address such failures, metrics of the network may be collected to try to detect outages. Such metrics may include processing capability, memory usage, input/output operations per second (IOPS), and others that can be collected in log files. The manner in which various communication points of the network (which may be referred to as "nodes" and may include computing devices such as servers, virtual machines (VMs), and software services) are connected and interact with each other may be described using network topology. The topology of a network may be visually represented in the form of a graph or diagram that shows the different nodes of the network and connections between the nodes referred to as "edges." The density of communications between two such nodes in a network may be referred to as "affinity" or "edge weight."

SUMMARY

Embodiments of the present disclosure are directed to computer systems, computer-readable media, and computer-implemented methods for multi-node failure processing in computer networks. One exemplary embodiment includes a computer system comprising a processor and a memory coupled to the processor. The memory stores instructions that, when executed by the processor, cause the computer system to receive computer-readable network flow information associated with a plurality of nodes of a network and to determine, based on the network flow information, a weighted adjacency matrix comprising the plurality of nodes and edges, wherein a node in the plurality of nodes is connected to at least one other node by an edge, and wherein an edge between a pair of nodes has an associated weight associated with a communication density between the pair of nodes. The memory further stores instructions to determine, based on the weighted adjacency matrix, a set of features for a respective node in the plurality of nodes, wherein the set of features includes: an out-degree centrality feature that indicates a weighted number of edges for which the respective node is a source, and an in-degree centrality feature that indicates a weighted number of edges for which the respective node is a target. The memory further stores instructions to determine, based on the set of features, an impact score for the respective node in the plurality of nodes that indicates a predicted level of impact to other nodes in the plurality of nodes resulting from a failure of the respective node. The memory further stores instructions to generate, based on the set of features and impact score, an impact area graph that depicts the respective node at the center of the impact area graph and the other nodes from the plurality of nodes positioned radially outward relative to the respective node based on a relative predicted impact to the other nodes from the failure of the respective node, and to present the impact area graph.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

FIG. 2B through FIG. 2M are examples of tables associated with features of the nodes shown in FIG. 2A in accordance with various embodiments of the present disclosure;

FIG. 2N is a graph illustrating an example of a relationship between network node impact score ranking and shortest path feature values in accordance with various embodiments of the present disclosure;

FIG. 2O through FIG. 2Q are additional examples of tables associated with features of the nodes shown in FIG. 2A in accordance with various embodiments of the present disclosure;

DETAILED DESCRIPTION

Figure 1:
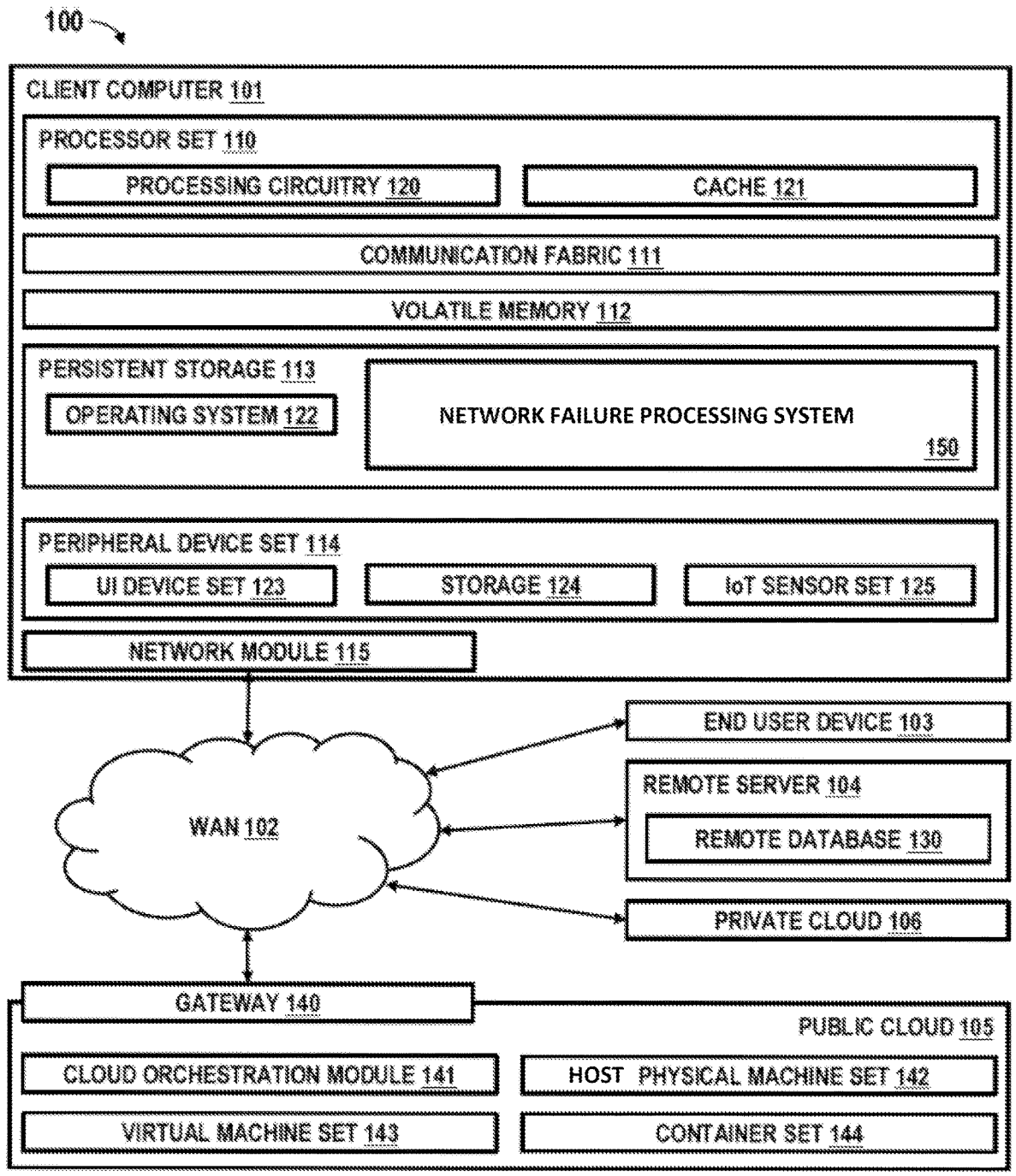
FIG. 1 is a block diagram illustrating an example of a computer system for use in conjunction with one or more embodiments of the present disclosure.

Disclosed herein are methods, systems, and computer program products for multi-node failure processing for computer networks. Among other things, embodiments of the present disclosure can predict the impact of a failure of any node in a multi-node network. Embodiments may further generate clear, intuitive graphical representations of such impacts, thereby improving the capabilities of network failure detection and mitigation systems.

Conventional network failure analysis systems can often identify important nodes in the network, and identify a network failure in a particular node after it has already occurred, but are generally unable to predict the impact of a failure in one node in the network on the other nodes in the network. Embodiments of the present disclosure address these and other issues to improve the functionality of network failure detection systems.

Technical solutions and benefits include the determination and prediction of predict the impact of a failure of any node in a multi-node network and provide solutions to mitigate the impact. A computer system can use network flow information of nodes in a multi-node network to predict a level of impact to other nodes when a given node fails in the multi-node network. Based on an impact score meeting a threshold for negatively impacting other nodes when the given node fails, the computer system can cause further actions to be executed to mitigate the failure. In one or more embodiments, the computer system can cause backup computing resources to be provided for the given node. The computer system can cause additional computing resources to be installed, brought online, and/or allocated for the given node, including additional computing devices, additional servers, additional virtual machines, and/or software services which can improve the redundancy of the given node meeting the threshold for negatively impacting other nodes.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums" or "computer-readable mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as a network failure processing system 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
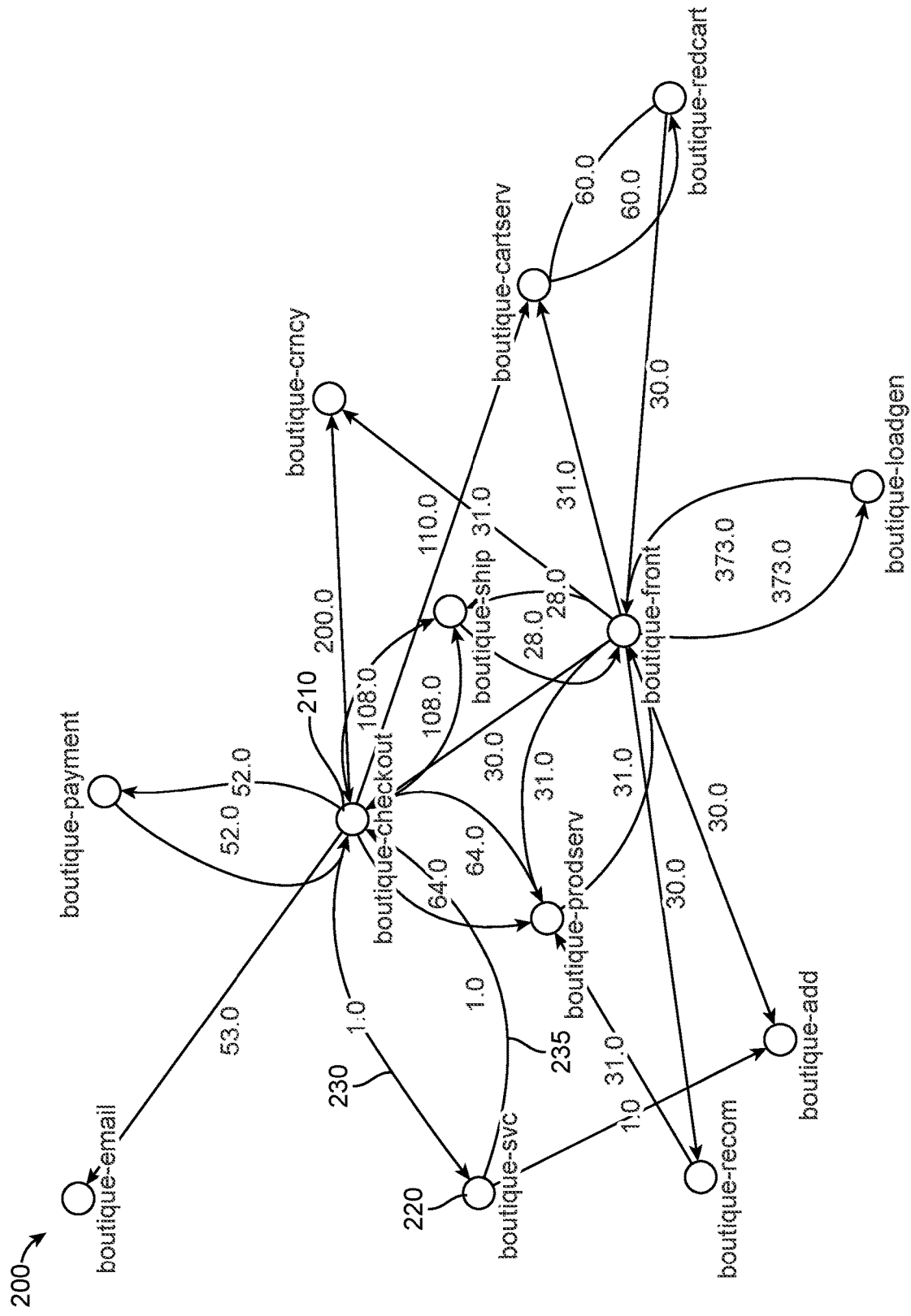
FIG. 2A is a diagram illustrating an example of a network in accordance with various embodiments of the present disclosure.

FIG. 2A illustrates an example of a network graph 200 representing a boutique retail application running on Kubernetes clusters. Vertices (also referred to herein as "nodes") represent the boutique application services and edges between the nodes represent the density of communication between the respective services over a period of time. For example, graph 200 includes a node 210 labeled "boutique-checkout" connected to multiple other nodes via edges, including node 220 labeled "boutique-svc" which is connected to node 210 via edge 230.

Graph 200 illustrates a weighted directional graph, with the respective weight of each edge applied to the respective edge. For example, the weight of edge 230 is 1.0. In this example, the boutique application includes a boutique "load-gen" service, which handles the login into application, as well as other services (e.g., boutique front, boutique checkout, boutique payment, boutique email, boutique product service, boutique add, boutique recommend, boutique currency, boutique cart service, etc.). The services associated with the nodes in graph 200 may be provided by one or more computing systems, as well as by one or more virtual machines (VMs).

Affinity data associated with communications between the nodes, and application load simulation may be generated by running different loads for this application. Such loads may be associated with business use cases like login, product addition into a user's virtual cart, order checkout, order payment, order shipment, emailing shipment details, and other functions at different time intervals. Network failure processing system 150 may collect this data on a periodic basis, or asynchronously based on the occurrence of one or more events associated with the loads. In some embodiments, the network failure processing system 150 may collect computer-readable data associated with the nodes in graph 200 stored in log files. The data stored in such log files may be stored in any suitable computer-readable format.

In some embodiments, the weight of each edge between two nodes in graph 200 is associated with the density of communication between the two nodes. In some embodiments, communication density may reflect the number of times communication happens between the nodes over a period of time. In other embodiments, communication density between nodes may be determined based on an average number of packets transferred between the nodes over a predetermined period of time. In the graph 200, two types of edge weightings are depicted, inward edge weights and outward edge weights.

For example, from the perspective of node 220 (boutique-svc), edge 230 is an inward weighted edge reflecting the density of communications received from node 210 (boutique-checkout), while edge 235 is an outward weighted edge reflecting the density of communications transmitted from node 220 to node 210. From the perspective of node 210, edge 230 is an outward weighted edge with node 220 and edge 235 is an inward weighted edge. As shown in graph 200, the directional arrows on each respective edge indicate whether the edge is associated with inward or outward weighting relative to each node.

FIG. 2B illustrates an example of a table showing a weighted adjacency matrix for the nodes and edges depicted in graph 200. In this example, Adj[i][j] indicates that there is an edge with weight x from vertex i to vertex j; Adj[j][i] indicates that there is an edge with weight x from vertex j to vertex i; and an edge weight of 0 means there is no edge existing between vertex i and vertex j. In some embodiments, network failure processing system 150 may generate a weighted adjacency matrix for a network (such as shown in FIG. 2B) based on the computer-readable log data collected from the nodes.

In some embodiments, network failure processing system 150 may determine a respective set of features for each node in a plurality of nodes in a network. For example, in some embodiments, the network failure processing system 150 may determine a degree centrality feature for each node. The degree centrality feature may comprise an out-degree centrality feature that indicates a weighted number of edges for which the respective node is a source, and an in-degree centrality feature that indicates a weighted number of edges for which the respective node is a target.

In some embodiments, the degree centrality metric defines a level of importance of a node in a graph. The higher the degree of a node, the more important it is in a graph. In some embodiments, the out-degree centrality feature is a local property of the node and, may not necessarily be considered in an analysis of the entire graph. This comprises of in-degree and out-degree based on the direction. In some embodiments, the out-degree centrality of a node may be represented as K(i) out, and may be determined based on the number of edges for which that node is the source. The weight of an edge is considered as well. For example, in some embodiments, out-degree centrality of a node may be determined as the sum of edge weights of the edges with that node as the source. For example, from the adjacency matrix in FIG. 2B, the out-degree centrality is the sum of the columns of the matrix of that particular node.

FIG. 2C illustrates an example of a table showing the out-degree centrality for the nodes in FIG. 2A. As illustrated in this table, from the out-degree centrality values for each node, it can be seen that the boutique_checkout and boutique_front nodes are the most important/influential nodes, as they have highest outward-degree values.

In some embodiments, the in-degree feature of a node may be determined based on the number of edges with that node as a target (receiver). In some embodiments, the degree centrality of a node is equal to the sum of edge weights of the edges with that node as a target. From the adjacency matrix in FIG. 2B, the in-degree centrality of a node may be determined as the sum of the rows of the matrix of that particular node.

FIG. 2D illustrates an example of a table showing the out-degree centrality for the nodes in FIG. 2A. As illustrated in this table, it can be seen that, based on the in-degree values of the nodes, the boutique_loadgen and boutique_front nodes are the most important/influential nodes as they have the highest in-degree values.

In some embodiments, network failure processing system 150 may determine a shortest path feature as part of the respective set of features determined for each node in the plurality of nodes in the network. In some embodiments, the shortest path is a path (e.g., distance) between two nodes in a network graph (such as graph 200 shown in FIG. 2A). In some embodiments the shortest path between two nodes is determined such that the sum of the weights of its constituent edges is minimized. In the example shown in FIG. 2A, the edge weights are positive edge weights and therefore system 150 may take the reciprocal of the edge weights to make it negative and compute the shortest path between two nodes. The shortest path feature may include a "shortest path in" feature and a "shortest path out" feature based on the respective direction of an edge. As discussed in more detail below, the shortest path features determined for each node may be used to determine other node features, such as closeness centrality and betweenness centrality.

In some embodiments, system 150 may determine the shortest path in for each node from the perspective of the node as a source and the remaining nodes as target nodes. The system 150 may traverse from the source node to each target node in an inward edge direction. If there is more than one path to reach a target node, the system 150 selects the path having a minimum distance value, wherein distance value is determined as the sum of reciprocal of edge weights (e.g., 1/edge weight).

For example, FIG. 2E illustrates an example of a numeric mapping between a node index and the node labels shown in FIG. 2A. FIG. 2F is a table showing the shortest path in for node "boutique-checkout" (index 12 in FIG. 2F) as the source node and the remaining nodes as target nodes. The shortest path in for the remaining nodes in the network topology shown in FIG. 2A may be similarly determined.

The shortest path out for each node may be determined similarly, with a particular node analyzed from the perspective of a source node and the remaining nodes as target nodes. System 150 may traverse from the source node to each target node in an outward edge direction. As with the shortest path in feature, if there is more than one path to reach the target then system 150 selects the path having a minimum distance value. FIG. 2G shows the shortest path out for node "boutique-checkout" as the source node and the remaining nodes as target nodes. The shortest path out feature for the other nodes may be similarly determined.

The system 150 may determine a closeness centrality feature for each node. In some embodiments, the closeness centrality metric defines the importance of a node in a graph based on how close it is to all other nodes in the graph. The closeness centrality feature may also be indicative of how quickly information can be transmitted to other nodes. In some embodiments, the higher the closeness centrality the higher the impact of the node. The closeness centrality feature may comprise a closeness centrality in feature, and a closeness centrality out feature, determined based on the directions of the edges in the graph.

In some embodiments, the closeness centrality out feature may be determined as the inverse of its average shortest path out length to all other nodes. The closeness centrality in feature may be determined as the inverse of its average shortest path in length to all other nodes.

For example, FIG. 2H illustrates a table showing the closeness centrality out values for the nodes in FIG. 2A. In this example, it can be seen that the boutique_checkout node 210 has the highest closeness centrality out value, and accordingly may have a relatively higher impact on other nodes in the topology depicted in FIG. 2A. FIG. 2I illustrates a table showing the closeness centraility in values for the nodes in FIG. 2A. In this example, boutique-cartserv has the highest closeness centrality in value, and thus may have a relatively higher impact on all other nodes.

System 150 may determine a "betweenness centrality" feature for each node. The betweenness centrality feature of a node may indicate the importance of the node in a network based upon how many times it occurs in the shortest path (e.g., shortest path in and shortest path out) between all pair of nodes in the topology. In some embodiments, the betweenness centrality feature may be used to find the nodes that serves as a bridge from one part of the graph to another.

Nodes having higher betweenness centrality values are the nodes that are on the shortest paths between a large number of pair of nodes, and hence can be more important than other nodes to the communication in a connected topology, as they are connected to a high number of nodes. FIG. 2J illustrates a table showing the betweenness centrality value for the nodes in the topology graph in FIG. 2A. In this example, it can be seen that the 'boutique_checkout' and 'boutique_front' nodes have the highest betweenness centrality. It may also be noted that the nodes with zero betweenness centrality in FIG. 2J (e.g., boutique-loadgen) are least connected nodes, and hence impact of failure and/or performance degradation of these nodes on other nodes may be minimal or non-existent.

In some embodiments, system 150 may determine an Eigenvector centrality feature for each node that indicates the importance of a node in a connected topology as a function of the importance of its neighbors. For example, if a node is connected to highly important nodes, it will have a higher Eigenvector centrality score as compared to a node which is connected to lesser important nodes.

In some embodiments, the Eigenvector centrality for a node may be determined using an Eigenvector decomposing (also referred to as an Eigendecomposition) of the adjacency matrix associated with the network, such as the adjacency matrix in FIG. 2B. From this matrix decomposition the system 150 may take the Eigenvector associated with a maximum Eigen value and normalize the values in the Eigenvector. This normalized Eigenvector may be used as the Eigenvector centrality for each respective node. FIG. 2K illustrates a table showing the Eigenvector centrality values for each node in FIG. 2A. As illustrated in this example, 'boutique_front' and 'boutique_loadgen' have the highest Eigenvector centrality values.

The system 150 may determine, based on the set of features determined for the plurality of nodes, a respective impact score for each respective node in the plurality of nodes. The impact score for a respective node may indicate a predicted level of impact to other nodes in the plurality of nodes resulting from a failure of the respective node.

In some embodiments, the impact score (also referred to herein as an "influence score") of a node may indicate how significant the node is in a particular network topology, and thus will likely have a higher impact on other nodes if it fails. In some embodiments, the system 150 may not necessarily identify the most significant node(s) associated with a failure by using the individual determined node features described above, since each feature may identify a different node as significant node as illustrated previously. For example, as described above for the exemplary network topology shown in FIG. 2A, the degree-in and degree-out features each identify different nodes (e.g., boutique-loadgen, boutique-front, boutique-checkout) whereas the closeness centrality in feature identifies boutique-cartserv as the most significant node.

Accordingly, embodiments of the present disclosure may determine the overall influence or impact of certain node based on a holistic analysis of the different features determined for the node. In some embodiments, the node impact score is directly proportional to the degree of the node and inversely proportional to the distance from the other nodes. In such cases, the impact score for a node may be determined as the sum of the Eigenvector centrality value and the multiplication of the degree of the nodes divided by square of distance between the nodes. In some embodiments, the impact/influence score may thus be determined according to:

$$T_{(i)} = E_{(i)c} + (\Sigma K_{(i)out} \times K_{(j)out}/S^2_{out(ij)} + \Sigma K_{(i)in} \times K_{(j)in}/S^2_{in(ij)})/2$$

Where:
$T_{(i)}$—Influence Score of Node I;
$E_{(i)c}$—Eigenvector Centrality of node I;
$K_{(i)out}$—Degree Out of Node I;
$K_{(j)out}$—Degree Out of Node J;
$K_{(i)in}$—Degree In of Node I;
$K_{(j)in}$—Degree In of Node J;
$S_{(ij)out}$—Shortest Path Out between node I and J; and
$S_{(ij)in}$—Shortest Path In between node I and J.

System 150 may predict the impact score of each node, and rank the node based on predicted score. In some embodiments, the system 150 may train a machine learning (ML) regression model, such as a ridge regression model, using the above-determined node features to predict the influence score of each node. In some embodiments, the regression ML model may be used to determine appropriate individual weights for each feature to predict the impact score. Based on the predicted influence score, the system 150 may rank each node, with the node having the maximum predicted influence score given top rank. An example of training data that may be provided to an ML model is illustrated in FIG. 2L, which includes determined values for features of the nodes in FIG. 2A.

Figures 2M, 2N:
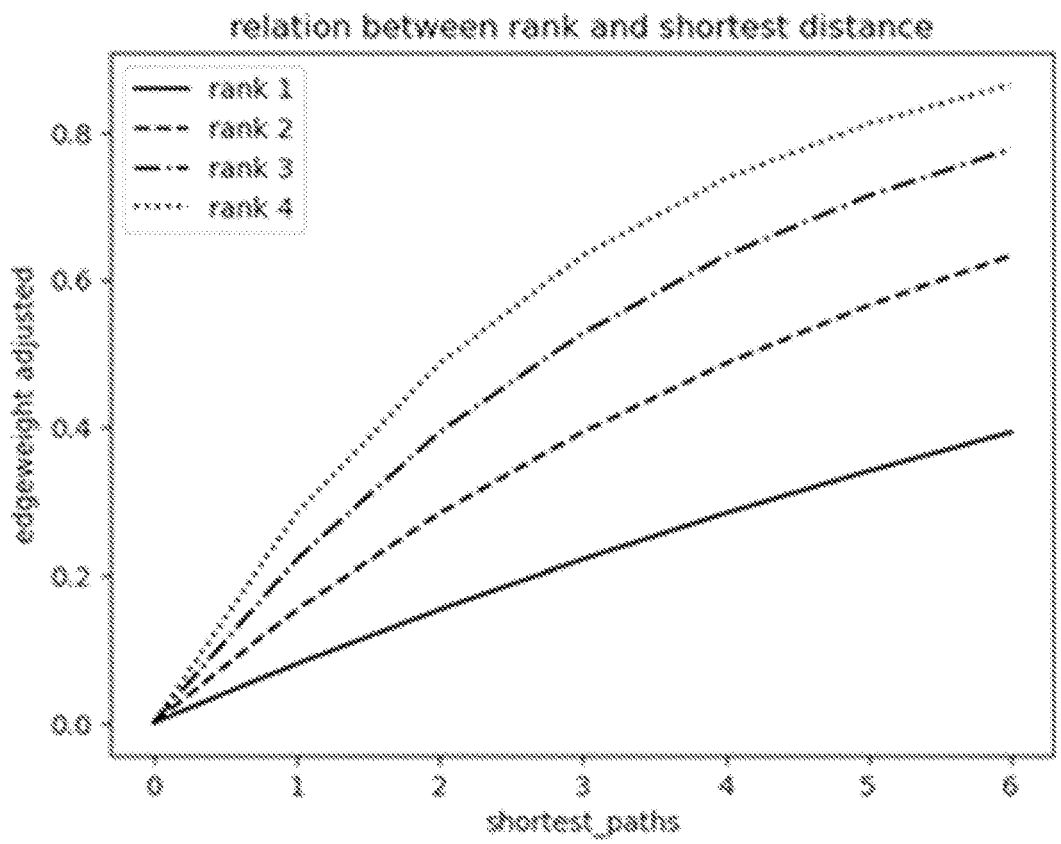

FIG. 2L further illustrates a table showing the predicted Impact/Influence score of each node from the network in FIG. 2A, while FIG. 2M shows the respective score and ranking for each node based on the predicted score. In this ranking, the nodes with higher influence rank will have higher impact on other nodes in the given topology.

Based on the predicted influence scores the system 150 may determine and graph the impact area for each node in the network. In the context of this disclosure a node being accordingly graphed is referred to as a 'seed node'. In some embodiments, there can be one single seed-node or there can be multiple seed nodes, as there can be multiple nodes in a given system which can degrade and/or fail simultaneously (or within a given time window).

To compute the impact area (also referred to herein as a "blast radius") of a seed node (one or multiple nodes), the system 150 may adjust the edge weights of the adjacency matrix determined for the network (e.g., the adjacency matrix in FIG. 2B). In some embodiments, the system 150 may adjust the edge weights based on the impact score ranking of the seed node and the shortest paths (shortest-path-in and shortest-path-out) features of the seed node. In some embodiments, the adjusted edge weight may be directly proportional to the rank of the seed node, therefore the seed node with highest impact score rank will have more influence on the edge weight adjustment. Similarly, the adjusted edge weight in such cases is inversely proportional to the shortest distance, meaning edges which are far from the seed node will have less adjustment in edge weights. The adjustment of the edge weights may be performed using an exponential decay edge weight adjustment process.

In some embodiments, the exponential decay edge weight adjustment process uses the impact score rank of the seed node and shortest distance between seed node and target nodes to adjust the edge weights in the adjacency matrix. The system 150 may determine the edge weight adjustment for both the inward direction and outward direction for the nodes by using the shortest path in feature to determine the edge weight adjustment in the inward direction and the shortest path out feature to determine the edge weight adjustment in the outward direction. In one example, the exponential decay edge weight adjustment process may be performed according to:

$$\text{Adjusted\_E}_{(i)} = E_{(i)} \times (1 - \exp(r \times (1 - s_{(i)})/N))$$

Where:
$E_{(i)}$—Actual edge weight in of node 'I' from seed node;
r—Rank of seed node;
$s_{(i)}$—Shortest distance in from seed node; and
N—Total number of nodes.

$$\text{Adjusted\_E}_{(o)} = E_{(o)} \times (1 - \exp(r \times (1 - s_{(o)})/N))$$

Where:

$E_{(o)}$—Actual edge weight out of node 'I' from seed node;
r—Rank of seed node;
$s_{(o)}$—Shortest distance out from seed node; and
N—Total number of nodes.

FIG. 2N illustrates a graph showing the relation between impact score ranking for the four highest-ranked nodes (rank 1-4) and the shortest distance features determined for the ranked nodes. As illustrated, the edge weight adjustment is directly proportional to seed node impact score rank, and inversely proportional to the shortest path feature value. Accordingly, the failure of a node with a higher impact score ranking will have more influence on nearby nodes compared to lower-ranked nodes.

The system 150 may adjust the edge weights for a single node failure as well as for performance degradation. In some embodiments, to adjust edge weights for single node failure, the system 150 may select any one node as seed node (e.g., 'boutique-checkout'). The system 150 may adjust the edge weights in the adjacency matrix (e.g., shown in FIG. 2B) using the above-explained exponential decay edge weight adjustment method. FIG. 2O illustrates an example of the adjacency matrix depicted in FIG. 2A after weights are adjusted for the boutique-checkout seed node.

The system 150 may determine edge weights for multi-node failure as well as performance degradation. In some embodiments, to determine the compounded impact of multiple nodes (instead of a single node) the system 150 performs an edge weight adjustment based on dependent and independent shortest paths and the exponential decay method described above.

The system 150 may select more than one node as seed node and sort the selected nodes based on their impact score ranking in ascending order to adjust the edge weights. The system 150 determines the shortest paths (shortest path in and shortest path out) of all selected seed nodes. If the shortest path does not contain any seed node (except the selected seed node), the system 150 may consider those shortest paths as independent shortest paths. By contrast, if the shortest path contains more than one seed node, then the system 150 may consider these shortest paths as dependent shortest paths.

The system 150 uses the exponential decay method described above to determine the adjusted edge weights. Referring back to FIG. 2E for the mapping between node indexes and node labels, an example of adjusting edge weights for dependent and independent shortest path scenarios may be performed as shown below. In the examples below, only outward directed edges are shown but in practice inward directed edges would also be processed:

Dependent Shortest Path Example:
1. Consider Node-2, Node-7, Node-12 as seed nodes and Node-6 as target node.
2. Node-2 to Node-6 shortest path outward—[2-6].
3. Node-7 to Node-6 shortest path outward—[7,12,2,6].
4. Node-12 to Node-6 shortest path outward—[12,2,6]. This example shows the overlap in shortest paths. The system 150 may consider the nearest seed node Node-2 to determine the 2-6 outward edge weight using the above-described edge weight adjustment formula.

Independent Shortest Path Example:
1. Consider Node-1, Node-2, Node-3 as seed nodes and Node-9 as target node.
2. Node-1 to Node-9 shortest path outward—[1,12,9].
3. Node-2 to Node-9 shortest path outward—[2,6,10,12,9].
4. Node-3 to Node-9 shortest path outward—[3,12,9]. Based on these independent short paths, the combined effect on the 12-9 edge weight will be a multiplication of individual impact. For example, assume Node-1 has 20%, Node-2 has 15% and Node-3 has 30% impact on Node-9's outward edge weight (e.g., these % may be determined using exponential decay method described above). In this example, the net impact will be:

Original outward edge weight of 12-9 edge=>53;

$$53(1-20/100)=>49(1-15/100)=>41.65(1-30/100)=>29.155;$$

Compounded edge weight after impact=>29 (rounding to nearest integer).

The system 150 may determine the seed node failure impact on other nodes based on the weight adjusted adjacency matrix. FIG. 2P illustrates a table showing features extracted from the adjusted adjacency matrix shown in FIG. 2O. In some embodiments, the system 150 may predict the influence scores of each node (e.g., using a trained regression ML model) based on the features shown in FIG. 2O. FIG. 2Q illustrates a table showing the predicted impact scores generated via a ridge regression model based on the features from FIG. 2P.

The system 150 may generate, based on the sets of features and impact scores for the plurality of nodes, an impact area graph for a respective node in the plurality of nodes. In some embodiments, the impact area graph depicts the respective node at the center of the impact area graph and other nodes from the plurality of nodes positioned radially outward relative to the respective node based on a relative predicted impact to each other node from the failure of the respective node. In this manner, the system 150 can visually depict the relative impact of a particular node failing to a user.

Figure 3A:
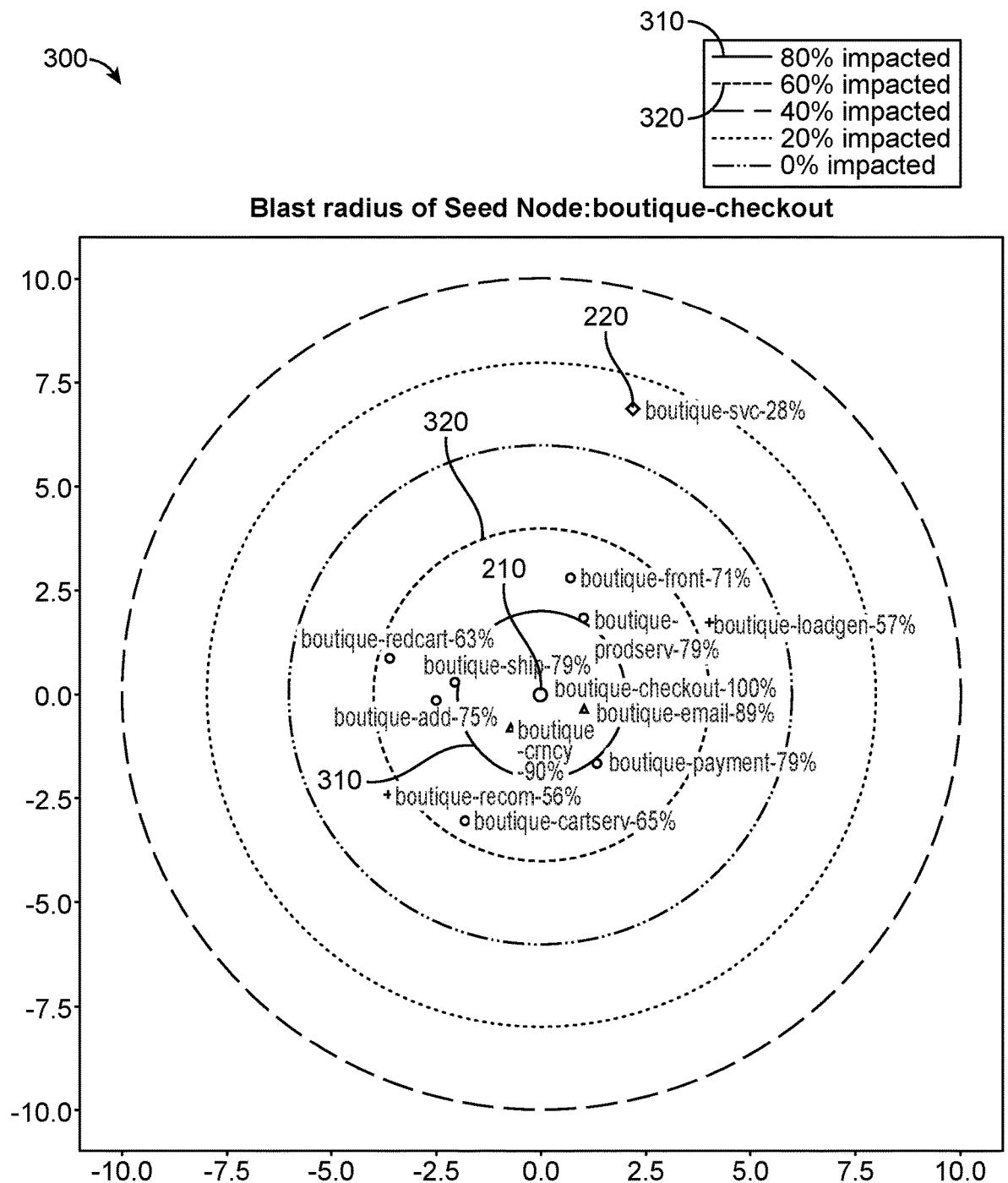
FIG. 3A illustrates an example of an impact area graph for a node in FIG. 2A in accordance with various embodiments of the disclosure.

FIG. 3A illustrates an impact area graph for the boutique-checkout node 210 as a seed node. The seed node (node 210) is depicted in the center of the graph 300, with other nodes disposed radially outward from the center. In this example, the distance from seed node (Ds)=100−% impact of node 'I'. For example, with the seed node being at the center of the graph 300, the other nodes in the network are positioned around the impact/blast center based on the computed impact/blast radius which describes the distance from the seed node. Graph 300 further includes concentric rings extending radially outward from the center, such as ring 310 (which indicates nodes within it are at least 80% impacted by a failure of seed node 210) and ring 320 (which indicates nodes within it are at least 60% impacted).

In this example, each node is labeled and includes an indication of the seed node's relative impact upon it expressed as a percentage. For instance, the seed node boutique-checkout 210 is at the center of the graph with a 100% impact indication, whereas boutique-payment is about 79% impacted (because of this seed node boutique-checkout failure) and boutique-svc is only 28% impacted. As can quickly and intuitively be seen by a user viewing the graph, other nodes in this connected topology are gathered near and around the center to seed node boutique-checkout 210, illustrating that the failure of boutique-checkout node 210 would have quite a significant impact on most other nodes in this system.

Figure 3B:
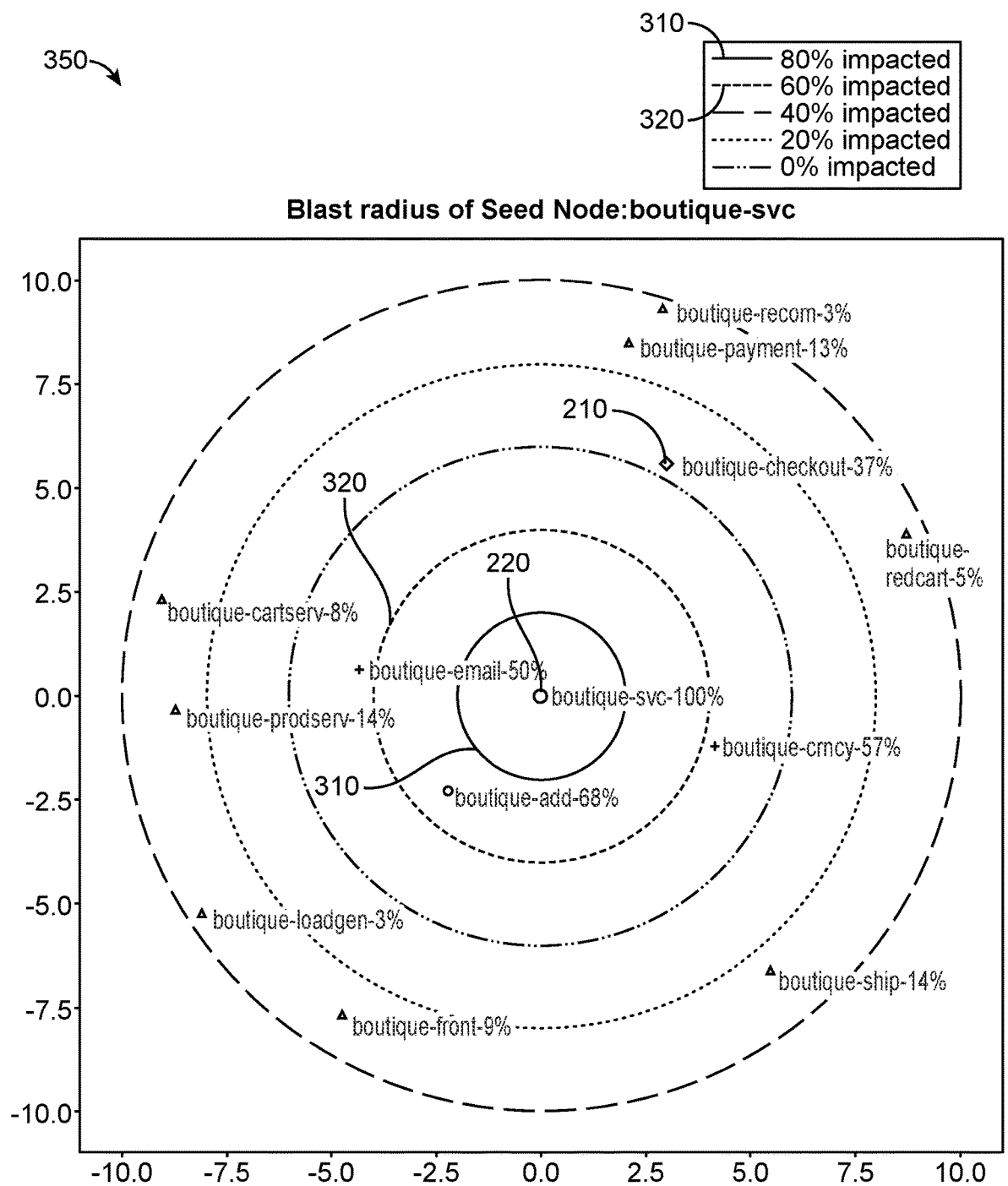
FIG. 3B illustrates an example of an impact area graph for another node in FIG. 2A in accordance with various embodiments of the disclosure.

FIG. 3B illustrates another example of an impact area graph for another node in the topology shown in FIG. 2A, namely, boutique-svc node 220. In this example, boutique-svc node 220 is the seed-node the impact of its failure is visually depicted in graph 350. In this example, in contrast to the example in FIG. 3A, most of the other nodes are not concentrated near the seed node 220 at the center, and are rather spread out, meaning the impact a failure associated with boutique-svc 220 is relatively lower for most other nodes than for a failure of boutique-checkout 210. For example, boutique-add is the only worst affected node here and that too with an impact score of 68% and many other nodes, such as boutique-loadgen, are almost not affected at all due to a failure of boutique-svc.

Figure 4:
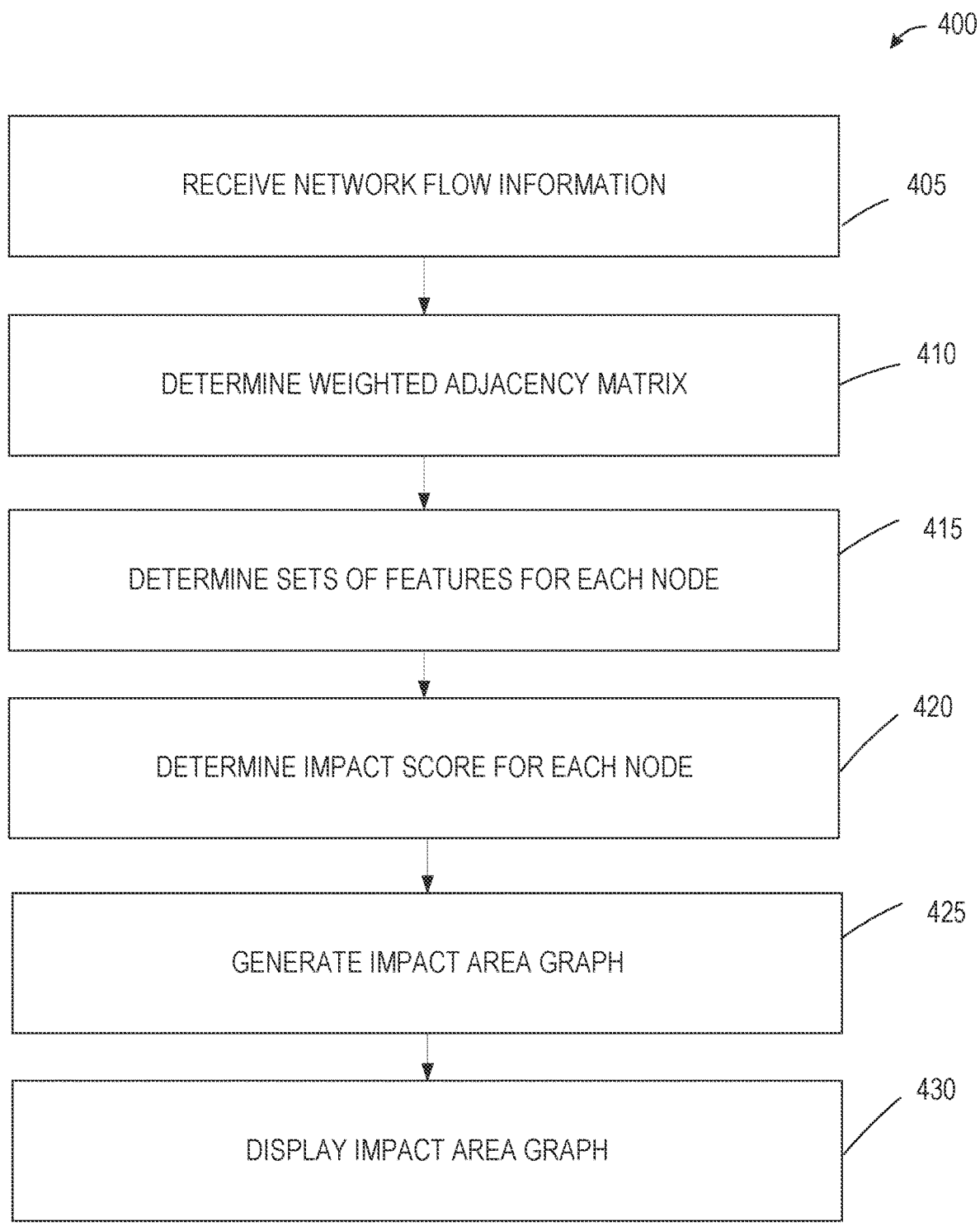
FIG. 4 is a flowchart of a method for training a neural network model in accordance with one or more embodiments of the present disclosure.

FIG. 4 illustrates an example of a process for neural network training in accordance with various embodiments of the present disclosure. Process 400 may be performed by any suitable system or combination of systems, such as neural network training system 150 in FIG. 1. In this example, process 400 includes, at 405, receiving computer-readable network flow information associated with a plurality of nodes of a network. The process 400 further includes, at 410, determining, based on the network flow information, a weighted adjacency matrix. In some embodiments, the weighted adjacency matrix comprises the plurality of nodes and edges between the plurality of the nodes, wherein each node in the plurality of nodes is connected to at least one other node by an edge, and wherein each edge between a pair of nodes has an associated weight associated with a communication density between the pair of nodes.

In some embodiments, each respective node in the plurality of nodes is associated with a computing resource of the network. Examples of such computing resources may include: a server, a virtual machine, and a software service. The network flow information may be received from one or more network flow logs that include information regarding communications between the plurality of nodes. For example, the network flow information from the one or more network flow logs may be received on a periodic basis at predetermined intervals.

Process 400 further includes, at 415, determining, based on the weighted adjacency matrix, a respective set of features for each respective node in the plurality of nodes. In some embodiments, the respective set of features for a respective node includes: an out-degree centrality feature that indicates a weighted number of edges for which the respective node is a source, and an in-degree centrality feature that indicates a weighted number of edges for which the respective node is a target.

In some embodiments, the set of features for the respective node further includes a shortest path feature that indicates a separate minimum aggregate weighted edge distance between the respective node and each other node in the plurality of nodes. For example, the shortest path feature may include a shortest path in feature that indicates a shortest weighted edge distance from another node to the respective node, and a shortest path out feature that indicates a shortest weighted edge distance from the respective node to the other node.

In some embodiments, the set of features for the respective node further includes a closeness centrality feature that indicates, based on the shortest path feature for the respective node, a relative closeness of the respective node to the other nodes in the plurality of nodes. For example, the closeness centrality feature may include a closeness centrality in feature that indicates an inverse of an average shortest weighted edge distance from the respective node to the other nodes in the plurality of nodes, and a closeness centrality out feature that indicates an inverse of an average shortest weighted edge distance from the other nodes in the plurality of nodes to the respective node. In some embodiments, the set of features for the respective node further includes an Eigenvector centrality feature determined using an Eigen-decomposition of the adjacency matrix based on the closeness centrality features for the other nodes in the plurality of nodes.

In some embodiments, the set of features for the respective node further includes a betweenness centrality feature that indicates a number of times the respective node occurs in each shortest path feature for each other node in the plurality of nodes.

Process 400 further includes, at 420, determining, based on the set of features for the plurality of nodes, a respective impact score for each respective node in the plurality of nodes. In some embodiments, the respective impact score indicates a predicted level of impact to other nodes in the plurality of nodes resulting from a failure of the respective node.

Process 400 further includes, at 425, generating, based on the sets of features and impact scores for the plurality of nodes, an impact area graph for a respective node in the plurality of nodes. In some embodiments, the impact area graph depicts the respective node at the center of the impact area graph and other nodes from the plurality of nodes positioned radially outward relative to the respective node based on a relative predicted impact to each other node from the failure of the respective node. Process 400 further includes, at 430, displaying the impact area graph. The impact area graph may be displayed, or otherwise presented, in any suitable manner. For example, the impact area graph may be presented via a display screen in communication with the computer system, in an audio fashion, or via holographic projection.

In some embodiments, the impact area graph is generated based on first network flow information received at a first predetermined interval, and the system may further: receive second network flow information at a second predetermined interval that is subsequent to the first predetermined interval; identify a change in a feature for a node from the plurality of nodes between the first network flow information and the second network flow information; and in response to identifying the change in the feature for the node, update at least a portion of the impact area graph.

In some embodiments, the impact area graph includes a plurality of concentric circles, each circle associated with a relative level of predicted impact to the other nodes from the failure of the respective node. The predicted impact of the failure of the respective node at the center of the impact graph may have a greater impact on a first other node relative to a second other node, and wherein the first other node is depicted in the impact graph relatively closer to the respective node than the second other node.

In some embodiments, each respective node depicted in the impact graph is labeled with an identifier and a numeric indicator reflecting a relative predicted impact of the failure of the node at the center of the impact graph on the respective node.

In some embodiments, determining the predicted impact score includes processing the set of features for the plurality of nodes using an artificial intelligence model. The predicted impact score may be determined by performing an exponential decay process using the associated weights for the edges between the plurality of nodes to determine adjusted weights for the edges. The adjusted weights for the edges may be determined based on a predicted compounded impact from a failure of at least two of the plurality nodes.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Embodiments of the present invention may include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:
   a processor; and
   a memory coupled to the processor and storing instructions that, when executed by the processor, cause the computer system to:
     receive computer-readable network flow information associated with a plurality of nodes of a network;
     determine, based on the network flow information, a weighted adjacency matrix comprising the plurality of nodes and edges, wherein a node in the plurality of nodes is connected to at least one other node by an edge, and wherein an edge between a pair of nodes has an associated weight associated with a communication density between the pair of nodes;
     determine, based on the weighted adjacency matrix, a set of features for a respective node in the plurality of nodes, wherein the set of features includes: an out-degree centrality feature that indicates a weighted number of edges for which the respective node is a source, and an in-degree centrality feature that indicates a weighted number of edges for which the respective node is a target;
     determine, based on the set of features, an impact score for the respective node in the plurality of nodes that indicates a predicted level of impact to other nodes in the plurality of nodes resulting from a failure of the respective node;
     generate, based on the set of features and impact score, an impact area graph that depicts the respective node at the center of the impact area graph and the other nodes from the plurality of nodes positioned radially outward relative to the respective node based on a relative predicted impact to the other nodes from the failure of the respective node; and
     present the impact area graph, wherein the respective node is associated with computing resources; and
     in response to the respective node being at the center of the impact area graph, modify at least one of the computing resources associated with the respective node to mitigate the relative predicted impact to the other nodes.

2. The computer system of claim 1, wherein the computing resources are part of the network.

3. The computer system of claim 1, wherein the computing resources include at least one of: a computing device, a server, a virtual machine, and a software service.

4. The computer system of claim 1, wherein the network flow information is received from one or more network flow logs that include information regarding communications between the plurality of nodes.

5. The computer system of claim 4, wherein the network flow information from the one or more network flow logs is received at predetermined intervals, and wherein the network flow information includes an indication of a number of communications between a pair of nodes and a direction of the communications between the pair of nodes.

6. The computer system of claim 5, wherein the impact area graph is generated based on first network flow information received at a first predetermined interval, and wherein the memory further stores instructions to cause the computer system to:
receive second network flow information at a second predetermined interval that is subsequent to the first predetermined interval;
identify a change in a feature for a node from the plurality of nodes between the first network flow information and the second network flow information; and
in response to identifying the change in the feature for the node, update at least a portion of the impact area graph.

7. The computer system of claim 1, wherein the impact area graph includes a plurality of concentric circles, and wherein a circle from the plurality of circles is associated with a relative level of predicted impact to the other nodes from the failure of the respective node.

8. The computer system of claim 1, wherein the set of features for the respective node further includes a shortest path feature that indicates a separate minimum aggregate weighted edge distance between the respective node and the other nodes in the plurality of nodes.

9. The computer system of claim 8, wherein the shortest path feature includes shortest path in feature that indicates a shortest weighted edge distance from another node to the respective node, and a shortest path out feature that indicates a shortest weighted edge distance from the respective node to the other node.

10. The computer system of claim 8, wherein the set of features for the respective node further includes a closeness centrality feature that indicates, based on the shortest path feature for the respective node, a relative closeness of the respective node to the other nodes in the plurality of nodes.

11. The computer system of claim 10, wherein the closeness centrality feature includes a closeness centrality in feature that indicates an inverse of an average shortest weighted edge distance from the respective node to the other nodes in the plurality of nodes, and a closeness centrality out feature that indicates an inverse of an average shortest weighted edge distance from the other nodes in the plurality of nodes to the respective node.

12. The computer system of claim 10, wherein the set of features for the respective node further includes an Eigenvector centrality feature determined using an Eigendecomposition of the adjacency matrix based on the closeness centrality features for the other nodes in the plurality of nodes.

13. The computer system of claim 8, wherein the set of features for the respective node further includes a betweenness centrality feature that indicates a number of times the respective node occurs in a shortest path feature for another node in the plurality of nodes.

14. The computer system of claim 1, wherein the predicted impact of the failure of the respective node at the center of the impact graph has a greater impact on a first other node relative to a second other node, and wherein the first other node is depicted in the impact graph relatively closer to the respective node than the second other node.

15. The computer system of claim 1, wherein a respective node depicted in the impact graph is labeled with an identifier and a numeric indicator reflecting a relative predicted impact of the failure of the node at the center of the impact graph on the respective node.

16. The computer system of claim 1, wherein determining the predicted impact score includes processing the set of features for the plurality of nodes using an artificial intelligence model.

17. The computer system of claim 1, wherein determining the predicted impact score includes performing an exponential decay process using the associated weights for the edges between the plurality of nodes to determine adjusted weights for the edges.

18. The computer system of claim 17, wherein determining the adjusted weights for the edges is based on a predicted compounded impact from a failure of at least two of the plurality nodes.

19. A computer-readable medium storing instructions that, when executed by a computer system, cause the computer system to:
receive computer-readable network flow information associated with a plurality of nodes of a network;
determine, based on the network flow information, a weighted adjacency matrix comprising the plurality of nodes and edges, wherein a node in the plurality of nodes is connected to at least one other node by an edge, and wherein an edge between a pair of nodes has an associated weight associated with a communication density between the pair of nodes;
determine, based on the weighted adjacency matrix, a set of features for a respective node in the plurality of nodes, wherein the set of features includes: an out-degree centrality feature that indicates a weighted number of edges for which the respective node is a source, and an in-degree centrality feature that indicates a weighted number of edges for which the respective node is a target;
determine, based on the set of features, an impact score for the respective node in the plurality of nodes that indicates a predicted level of impact to other nodes in the plurality of nodes resulting from a failure of the respective node;
generate, based on the set of features and impact score, an impact area graph that depicts the respective node at the center of the impact area graph and the other nodes from the plurality of nodes positioned radially outward relative to the respective node based on a relative predicted impact to the other nodes from the failure of the respective node;
present the impact area graph, wherein the respective node is associated with computing resources; and
in response to the respective node being at the center of the impact area graph, modify at least one of the computing resources associated with the respective node to mitigate the relative predicted impact to the other nodes.

20. A computer-implemented method comprising:
- receiving, by a computer system, computer-readable network flow information associated with a plurality of nodes of a network;
- determining, by the computer system and based on the network flow information, a weighted adjacency matrix comprising the plurality of nodes and edges, wherein a node in the plurality of nodes is connected to at least one other node by an edge, and wherein an edge between a pair of nodes has an associated weight associated with a communication density between the pair of nodes;
- determining, by the computer system and based on the weighted adjacency matrix, a set of features for a respective node in the plurality of nodes, wherein the set of features includes: an out-degree centrality feature that indicates a weighted number of edges for which the respective node is a source, and an in-degree centrality feature that indicates a weighted number of edges for which the respective node is a target;
- determining, by the computer system and based on the set of features, an impact score for the respective node in the plurality of nodes that indicates a predicted level of impact to other nodes in the plurality of nodes resulting from a failure of the respective node;
- generating, by the computer system and based on the set of features and impact score, an impact area graph that depicts the respective node at the center of the impact area graph and the other nodes from the plurality of nodes positioned radially outward relative to the respective node based on a relative predicted impact to the other nodes from the failure of the respective node;
- presenting the impact area graph by the computer system, wherein the respective node is associated with computing resources; and
- in response to the respective node being at the center of the impact area graph, modifying at least one of the computing resources associated with the respective node to mitigate the relative predicted impact to the other nodes.

* * * * *